(12) United States Patent
Johnson et al.

(10) Patent No.: US 8,293,103 B2
(45) Date of Patent: Oct. 23, 2012

(54) SPIN-ON FILTER ASSEMBLY AND METHODS

(75) Inventors: Philip E. Johnson, Apple Valley, MN (US); Claudio Formica, Pomponesco (IT); Enrico Greco, Villa Poma (IT); Michael L. Brown, Mendota Heights, MN (US); John R. Hacker, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 969 days.

(21) Appl. No.: 11/567,447

(22) Filed: Dec. 6, 2006

(65) Prior Publication Data

US 2007/0209992 A1    Sep. 13, 2007

Related U.S. Application Data

(60) Provisional application No. 60/748,941, filed on Dec. 8, 2005.

(51) Int. Cl.
*B01D 35/30* (2006.01)
*B01D 27/00* (2006.01)

(52) U.S. Cl. ........ 210/232; 210/435; 210/440; 210/450; 210/443

(58) Field of Classification Search .................. 210/232, 210/435, 440, 450, 443, DIG. 17
See application file for complete search history.

(56) References Cited

U.S. PATENT DOCUMENTS

| | | | |
|---|---|---|---|
| 2,888,141 A | 5/1959 | Coates et al. | |
| 3,036,711 A | 5/1962 | Wilhelm | |
| 3,061,101 A | 10/1962 | Humbert, Jr. | |
| 3,232,437 A * | 2/1966 | Hultgren | 210/440 |
| 3,307,705 A | 3/1967 | Halmenschlager | |
| 3,567,023 A | 3/1971 | Buckman et al. | |
| 3,616,933 A | 11/1971 | Baldwin | |
| 3,677,412 A | 7/1972 | Connor | |
| 3,722,691 A | 3/1973 | Francois | |
| 3,726,262 A | 4/1973 | Moon | |
| 3,743,096 A | 7/1973 | Harvey, Jr. et al. | |

(Continued)

FOREIGN PATENT DOCUMENTS

CA    583608    9/1959

(Continued)

OTHER PUBLICATIONS

International Search Report mailed May 30, 2007.

*Primary Examiner* — Benjamin Kurtz

(74) *Attorney, Agent, or Firm* — Merchant & Gould P.C

(57) ABSTRACT

A spin-on filter cartridge includes a housing, a filter element operably oriented in the housing, a baffle plate, and a seal arrangement. The baffle plate is operably oriented over the housing open end and defines a central flow aperture. The baffle plate also defines a continuous groove immediately adjacent to and circumscribing the central flow aperture. The seal arrangement is secured to the baffle plate and spaced from and circumscribing the continuous groove. A filter assembly including the spin-on filter cartridge and a filter head is also disclosed wherein the filter cartridge is removably mountable on the filter head. When the spin-on filter cartridge is oriented on the filter head, a seal member is received within the continuous groove and the seal arrangement forms a seal between and against the baffle plate and the filter head. The seal can be radial or axial or have both axial and radial components.

9 Claims, 8 Drawing Sheets

U.S. PATENT DOCUMENTS

| | | |
|---|---|---|
| 3,773,180 A | 11/1973 | Harrison |
| 3,785,491 A | 1/1974 | Dudinec et al. |
| 3,794,170 A | 2/1974 | Yamaguchi |
| 3,859,216 A | 1/1975 | Sisson et al. |
| 3,912,633 A | 10/1975 | Delaney |
| 3,929,643 A | 12/1975 | Donaldson et al. |
| 3,975,273 A | 8/1976 | Shaltz et al. |
| 3,985,657 A | 10/1976 | Coughlan |
| 4,028,243 A | 6/1977 | Offer et al. |
| 4,035,306 A | 7/1977 | Maddocks |
| 4,045,349 A | 8/1977 | Humbert, Jr. |
| 4,051,036 A | 9/1977 | Conrad et al. |
| 4,052,307 A | 10/1977 | Humbert, Jr. |
| 4,075,097 A | 2/1978 | Paul |
| 4,075,098 A | 2/1978 | Paul et al. |
| 4,146,475 A | 3/1979 | Forsland |
| 4,168,237 A | 9/1979 | Pickett et al. |
| 4,169,058 A | 9/1979 | Pickett et al. |
| 4,237,015 A | 12/1980 | Fearnhead |
| 4,268,384 A | 5/1981 | Rosaen et al. |
| 4,288,030 A | 9/1981 | Beazley et al. |
| 4,292,179 A | 9/1981 | Stone et al. |
| 4,314,903 A | 2/1982 | Hanley |
| 4,324,660 A | 4/1982 | Peyton et al. |
| 4,364,829 A | 12/1982 | Atkins et al. |
| 4,369,113 A | 1/1983 | Stifelman |
| 4,400,167 A | 8/1983 | Beazley et al. |
| 4,400,864 A | 8/1983 | Peyton et al. |
| 4,401,563 A | 8/1983 | Koelfgen |
| 4,416,776 A | 11/1983 | Brundidge |
| 4,452,695 A | 6/1984 | Schmidt |
| 4,452,697 A | 6/1984 | Conrad |
| 4,454,037 A | 6/1984 | Conterio et al. |
| 4,465,595 A | 8/1984 | Cooper |
| 4,473,471 A | 9/1984 | Robichaud et al. |
| 4,497,706 A | 2/1985 | Pickett et al. |
| 4,507,199 A | 3/1985 | Carlisle |
| 4,512,882 A | 4/1985 | Fischer et al. |
| 4,522,712 A | 6/1985 | Fischer et al. |
| 4,617,118 A | 10/1986 | Smart |
| 4,629,558 A | 12/1986 | Garritty |
| 4,640,772 A | 2/1987 | Graham |
| 4,642,183 A | 2/1987 | Hebert |
| 4,645,591 A | 2/1987 | Gerulis |
| 4,719,012 A | 1/1988 | Groezinger et al. |
| 4,728,421 A | 3/1988 | Moddemeyer |
| 4,732,671 A | 3/1988 | Thornton et al. |
| 4,738,776 A | 4/1988 | Brown |
| 4,743,374 A | 5/1988 | Stifelman |
| 4,756,826 A | 7/1988 | Horvath |
| 4,764,275 A | 8/1988 | Robichaud |
| 4,783,256 A | 11/1988 | Cooper et al. |
| 4,812,230 A | 3/1989 | Gerulis |
| 4,818,385 A | 4/1989 | Medley, III |
| 4,820,409 A | 4/1989 | Lowsky et al. |
| 4,826,592 A | 5/1989 | Taylor |
| 4,832,844 A | 5/1989 | Ayers |
| 4,851,117 A | 7/1989 | Foust |
| 4,853,118 A | 8/1989 | Brownell et al. |
| 4,855,047 A | 8/1989 | Firth |
| 4,857,189 A | 8/1989 | Thomsen et al. |
| 4,857,195 A | 8/1989 | Brownell et al. |
| 4,859,328 A | 8/1989 | Groezinger et al. |
| 4,865,727 A | 9/1989 | Krauss |
| 4,865,731 A | 9/1989 | Setzer, Sr. |
| 4,871,455 A | 10/1989 | Terhune et al. |
| 4,879,035 A | 11/1989 | Thompson |
| 4,897,186 A | 1/1990 | Gerulis |
| 4,915,831 A | 4/1990 | Taylor |
| 4,923,603 A | 5/1990 | Maykulsky |
| 4,948,503 A | 8/1990 | Baumann et al. |
| 4,950,400 A | 8/1990 | Girondi |
| 4,956,086 A | 9/1990 | Thomsen et al. |
| 4,959,141 A | 9/1990 | Anderson |
| 4,976,854 A | 12/1990 | Yano et al. |
| 4,989,636 A | 2/1991 | Hunter et al. |
| 4,990,247 A | 2/1991 | Vandenberk |
| 4,992,166 A | 2/1991 | Lowsky et al. |
| 4,997,556 A | 3/1991 | Yano et al. |
| 5,000,847 A | 3/1991 | Huang |
| 5,006,237 A | 4/1991 | Jones |
| 5,009,779 A | 4/1991 | Hebert |
| 5,013,434 A | 5/1991 | Furrow |
| 5,024,760 A | 6/1991 | Kemper |
| 5,039,406 A | 8/1991 | Whittington |
| 5,041,221 A | 8/1991 | Drusi |
| 5,045,192 A | 9/1991 | Terhune |
| 5,061,379 A | 10/1991 | White |
| 5,066,391 A | 11/1991 | Faria |
| 5,071,549 A | 12/1991 | Häuslein |
| 5,076,918 A | 12/1991 | Foust et al. |
| 5,078,877 A | 1/1992 | Cudaback et al. |
| 5,080,787 A | 1/1992 | Brown et al. |
| 5,104,537 A | 4/1992 | Stifelman et al. |
| 5,110,460 A | 5/1992 | Gilas |
| 5,114,572 A | 5/1992 | Hunter et al. |
| 5,139,658 A | 8/1992 | Hodge |
| 5,141,637 A | 8/1992 | Reed et al. |
| 5,171,430 A | 12/1992 | Beach et al. |
| 5,180,490 A | 1/1993 | Eihusen et al. |
| 5,182,015 A | 1/1993 | Lee |
| 5,196,112 A | 3/1993 | Eichman |
| 5,207,898 A | 5/1993 | Hodgkins |
| 5,209,842 A | 5/1993 | Moor |
| RE34,274 E | 6/1993 | Foust |
| 5,217,606 A | 6/1993 | Ramponi et al. |
| 5,219,525 A | 6/1993 | Harrison |
| 5,230,795 A | 7/1993 | Yang |
| 5,236,064 A | 8/1993 | Wagoner |
| 5,258,118 A | 11/1993 | Gouritin et al. |
| 5,259,953 A | 11/1993 | Baracchi et al. |
| 5,284,579 A | 2/1994 | Covington |
| 5,298,158 A | 3/1994 | Anderson |
| 5,301,958 A | 4/1994 | Covington |
| 5,316,665 A | 5/1994 | Hart |
| 5,328,605 A | 7/1994 | Lin |
| 5,328,606 A | 7/1994 | Warren et al. |
| 5,342,519 A | 8/1994 | Friedmann et al. |
| 5,350,506 A | 9/1994 | Dombek et al. |
| 5,362,390 A | 11/1994 | Widenhoefer et al. |
| 5,366,400 A | 11/1994 | Kucik |
| 5,374,355 A | 12/1994 | Habiger et al. |
| 5,395,518 A | 3/1995 | Gulsvig |
| 5,405,527 A | 4/1995 | Covington |
| 5,411,659 A | 5/1995 | Nichols |
| 5,431,588 A | 7/1995 | Kucik |
| 5,435,346 A | 7/1995 | Tregidgo et al. |
| 5,435,915 A | 7/1995 | Connors, Jr. |
| 5,447,627 A | 9/1995 | Loafman et al. |
| 5,453,195 A | 9/1995 | Jorgenson et al. |
| 5,476,585 A | 12/1995 | Mills |
| 5,490,930 A | 2/1996 | Krull |
| 5,525,226 A | 6/1996 | Brown et al. |
| 5,567,323 A | 10/1996 | Harrison, Jr. |
| 5,571,412 A | 11/1996 | Nerli |
| 5,593,577 A * | 1/1997 | Imai et al. ............ 210/232 |
| 5,605,625 A | 2/1997 | Mills |
| RE35,564 E | 7/1997 | Gerulis |
| 5,643,448 A | 7/1997 | Martin et al. |
| 5,667,699 A | 9/1997 | Schlise |
| 5,679,244 A | 10/1997 | Tettman et al. |
| 5,681,461 A | 10/1997 | Gullett et al. |
| 5,690,814 A | 11/1997 | Holt |
| 5,690,816 A | 11/1997 | Covington |
| 5,702,602 A | 12/1997 | Brown et al. |
| 5,725,031 A | 3/1998 | Bilski et al. |
| 5,744,032 A | 4/1998 | Kemper |
| 5,762,671 A | 6/1998 | Farrow et al. |
| 5,766,451 A | 6/1998 | Sparling |
| 5,772,881 A | 6/1998 | Stockhowe et al. |
| 5,785,850 A | 7/1998 | Lynch et al. |
| 5,814,211 A | 9/1998 | Leo |
| 5,830,349 A | 11/1998 | Roll et al. |
| 5,846,416 A | 12/1998 | Gullett |
| 5,858,225 A | 1/1999 | Nerli |
| 5,876,600 A * | 3/1999 | Matsubara et al. ........ 210/443 |
| 5,902,478 A | 5/1999 | O'Ryan |

| | | | |
|---|---|---|---|
| 5,902,479 A * | 5/1999 | Fukumori et al. ............ 210/248 |
| 5,906,221 A | 5/1999 | Mancell |
| 5,906,736 A | 5/1999 | Bounnakhom et al. |
| 5,906,740 A | 5/1999 | Brown et al. |
| 5,928,513 A | 7/1999 | Bradford |
| 5,958,230 A | 9/1999 | Pyle et al. |
| 5,988,399 A | 11/1999 | Brown et al. |
| 5,996,810 A | 12/1999 | Bounnakhom et al. |
| 6,006,924 A | 12/1999 | Sandford |
| 6,019,229 A | 2/2000 | Rao |
| 6,024,229 A | 2/2000 | Ayers |
| 6,024,869 A | 2/2000 | Stifelman |
| 6,033,578 A | 3/2000 | Loewen |
| 6,045,692 A | 4/2000 | Bilski et al. |
| 6,045,693 A | 4/2000 | Miller et al. |
| 6,068,762 A | 5/2000 | Stone et al. |
| 6,068,763 A | 5/2000 | Goddard |
| 6,073,937 A | 6/2000 | Stevens et al. |
| 6,080,310 A | 6/2000 | Bolser et al. |
| 6,110,365 A | 8/2000 | Bartels et al. |
| 6,120,685 A | 9/2000 | Carlson et al. |
| 6,126,823 A | 10/2000 | Soderlund et al. |
| 6,139,738 A | 10/2000 | Maxwell |
| 6,146,527 A * | 11/2000 | Oelschlaegel ................ 210/232 |
| 6,155,431 A | 12/2000 | Langsdorf et al. |
| 6,158,592 A | 12/2000 | Reinhart et al. |
| 6,173,859 B1 | 1/2001 | Schumann et al. |
| 6,187,188 B1 | 2/2001 | Janik et al. |
| 6,187,191 B1 | 2/2001 | Koivula et al. |
| 6,193,884 B1 | 2/2001 | Magnusson et al. |
| 6,202,859 B1 | 3/2001 | Langsdorf et al. |
| 6,207,050 B1 | 3/2001 | Holifield |
| 6,214,215 B1 | 4/2001 | Berkey et al. |
| 6,217,762 B1 | 4/2001 | Rooney et al. |
| 6,217,763 B1 | 4/2001 | Lawrence et al. |
| 6,221,242 B1 | 4/2001 | Deibel et al. |
| 6,224,754 B1 | 5/2001 | Schiavon et al. |
| 6,227,381 B1 | 5/2001 | Koivula |
| 6,228,274 B1 | 5/2001 | Deibel et al. |
| 6,245,232 B1 | 6/2001 | Craft |
| 6,257,417 B1 | 7/2001 | Szumera |
| 6,264,833 B1 | 7/2001 | Reamsnyder et al. |
| 6,267,875 B1 | 7/2001 | Leo |
| 6,270,660 B1 | 8/2001 | Roll et al. |
| 6,280,620 B1 | 8/2001 | Duran |
| 6,303,031 B1 | 10/2001 | Senner |
| 6,334,950 B1 | 1/2002 | Bogacki et al. |
| 6,345,721 B1 | 2/2002 | Durre et al. |
| 6,349,836 B1 | 2/2002 | Langsdorf et al. |
| 6,350,379 B1 | 2/2002 | Roll et al. |
| 6,355,169 B1 | 3/2002 | Smith |
| 6,375,836 B1 | 4/2002 | Yano et al. |
| 6,375,840 B1 | 4/2002 | Hunter |
| 6,387,259 B1 | 5/2002 | Roll |
| 6,391,193 B1 | 5/2002 | Luka |
| 6,422,395 B1 | 7/2002 | Verdegan et al. |
| 6,423,222 B1 | 7/2002 | Shively et al. |
| 6,423,225 B2 | 7/2002 | Wong et al. |
| 6,444,123 B1 | 9/2002 | Caiozza |
| 6,464,863 B1 * | 10/2002 | Nguyen ................ 210/167.03 |
| 6,468,425 B2 | 10/2002 | Reinhart |
| 6,471,071 B1 | 10/2002 | Shoaf et al. |
| 6,485,635 B1 | 11/2002 | Gandini et al. |
| 6,488,845 B1 | 12/2002 | Neufeld et al. |
| 6,551,506 B2 | 4/2003 | Caiozza |
| 6,554,140 B2 | 4/2003 | Steger, Jr. et al. |
| 6,568,539 B1 | 5/2003 | Deibel et al. |
| 6,571,961 B2 | 6/2003 | Demirdogen |
| 6,579,448 B2 | 6/2003 | Dworatzek |
| 6,585,887 B2 | 7/2003 | Michels et al. |
| 6,588,602 B1 | 7/2003 | McKenzie |
| 6,595,372 B1 | 7/2003 | Minowa et al. |
| 6,605,215 B2 | 8/2003 | Assion |
| 6,615,989 B2 | 9/2003 | Brown et al. |
| 6,616,838 B1 | 9/2003 | Harris |
| 6,649,049 B1 | 11/2003 | Caiozza |
| 6,666,968 B2 | 12/2003 | Smith et al. |
| 6,679,990 B2 | 1/2004 | Reinhart |
| 6,695,891 B2 | 2/2004 | Reid |
| 6,723,239 B2 | 4/2004 | Maxwell |
| 6,726,030 B1 | 4/2004 | McKenzie |
| 6,758,969 B2 | 7/2004 | Caiozza |
| 6,761,822 B1 | 7/2004 | Rhyne et al. |
| 6,770,110 B2 | 8/2004 | Seifert et al. |
| 6,790,348 B2 | 9/2004 | Orborn |
| 6,793,818 B1 | 9/2004 | Entringer et al. |
| 6,823,996 B2 * | 11/2004 | Durre ............................ 210/443 |
| 6,863,811 B2 | 3/2005 | Janik |
| 6,872,304 B1 | 3/2005 | Gebert |
| 6,893,555 B2 | 5/2005 | Roper et al. |
| 6,922,894 B2 | 8/2005 | Durre |
| 6,966,981 B2 | 11/2005 | Binder et al. |
| 6,969,458 B1 | 11/2005 | McKenzie |
| 6,974,539 B1 | 12/2005 | McKenzie |
| 6,977,006 B2 | 12/2005 | Reid |
| 6,994,784 B2 | 2/2006 | Jainek |
| 6,998,045 B2 | 2/2006 | Durre |
| 7,018,531 B2 | 3/2006 | Eilers et al. |
| 7,048,848 B2 | 5/2006 | Assion |
| 7,297,282 B2 * | 11/2007 | Suzumori et al. ............. 210/767 |
| 2003/0196939 A1 * | 10/2003 | Binder et al. ................. 210/136 |

FOREIGN PATENT DOCUMENTS

| | | |
|---|---|---|
| FR | 1 490 916 | 8/1967 |
| RU | 1736566 | 5/1992 |
| WO | WO 2005/102492 | 11/2005 |

* cited by examiner

SPIN-ON FILTER ASSEMBLY AND METHODS

This application claims priority under 35 U.S.C. §119(e) to U.S. Provisional Application Ser. No. 60/748,941, filed Dec. 8, 2005. The complete disclosure of Application 60/748,941 is incorporated herein by reference.

TECHNICAL FIELD

This application relates to a fluid filter of the spin-on type.

BACKGROUND

Spin-on filter assemblies include two parts—a filter head with a threaded spud and a removable and replaceable filter cartridge. The filter head is typically permanently mounted to equipment, such as an engine, hydraulics, or a generator. The filter head has inlet channels for conveying fluid to be filtered to the filter cartridge, and outlet channels for conveying fluid that has been filtered by the cartridge for use by the equipment. The filter cartridge will typically include an outer can or housing holding a filter element of filter media therewithin. The filter cartridge is typically useable over some limited duration due to the limited life of the filter media within. The filter cartridge is removed from the filter head and disposed of and is then replaced with a new filter cartridge. The filter cartridge and filter head are removably connected to each other, typically through a threaded connection. The spud on the filter head will typically have threads, while the filter cartridge will have a threaded aperture to fit on the threaded spud. The threaded connection between the filter cartridge and filter head can sometimes present a leak path for unfiltered fluids. That is, sometimes fluid that has not been filtered can travel along the threads and reach the clean side of the filter without first passing through the filter media. This leakage can lead to particulate material traveling to downstream equipment, which can present problems. Improvements are desirable.

SUMMARY

A spin-on filter cartridge includes a housing, a filter element operably oriented in the housing, a baffle plate, and a seal arrangement. The baffle plate is operably oriented over the housing open end. The baffle plate defines a central flow aperture. The baffle plate defines a continuous groove immediately adjacent to and circumscribing the central flow aperture. The seal arrangement is secured to the baffle plate spaced from and circumscribing the continuous groove.

In another aspect, a filter assembly includes a spin-on filter cartridge as characterized above and a filter head. The spin-on filter cartridge is removably mountable on the filter head. The filter head includes a central spud defining outer threads. An O-ring seal member is operably oriented around the central spud. When the spin-on filter cartridge is operably oriented on the filter head, the O-ring seal member is received within the continuous groove and the seal arrangement forms a seal between and against the baffle plate and the filter head.

In another aspect, a method of assembling a filter assembly includes spinning a filter cartridge as characterized above onto a filter head to form a primary seal between the baffle plate on the filter cartridge and the filter head, and until a seal member fixed to the filter head is received within the continuous groove.

In another aspect, a filter head is provided. The filter head includes a block defining fluid flow channels; a central spud having a threaded outer wall; and a seal member secured to and circumscribing the central spud.

DETAILED DESCRIPTION

Figure 1:
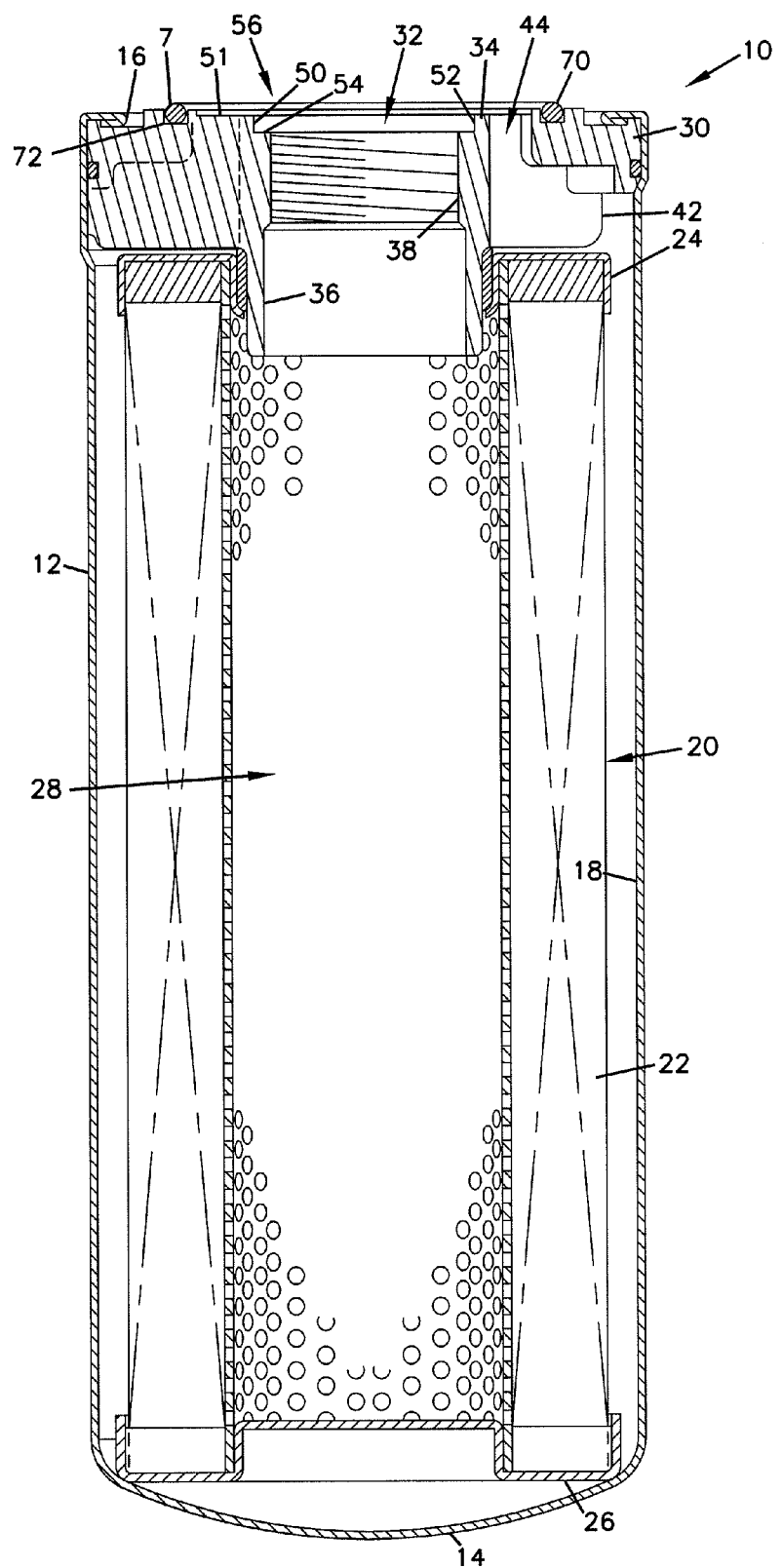
FIG. 1 is a cross-sectional view of a spin-on filter cartridge constructed according to principles of this disclosure.

In FIG. 1, a spin-on filter cartridge is depicted generally at 10. The spin-on filter cartridge 10, with the exception of certain details in the baffle plate, can be constructed according to U.S. Pat. No. 4,369,113, which is incorporated herein by reference. The filter assembly 10 includes a can or housing 12 having a closed end 14 and an open end 16. The housing 12 defines an interior volume 18. A filter element 20 is operably oriented in the housing interior volume 18. The filter element 20 can be conventionally constructed including filter media 22 extending between first and second end caps 24, 26. In the embodiment shown, the filter element 20 is cylindrical in shape and has pleated media 24. The filter element 20 defines an open filter interior 28.

A baffle plate is shown at 30. The baffle plate 30 is operably oriented over the housing open end 16. The baffle plate 30 defines a central flow aperture 32. In preferred embodiments, the central flow aperture 32 is an outlet aperture forming an outlet arrangement.

Figure 2:
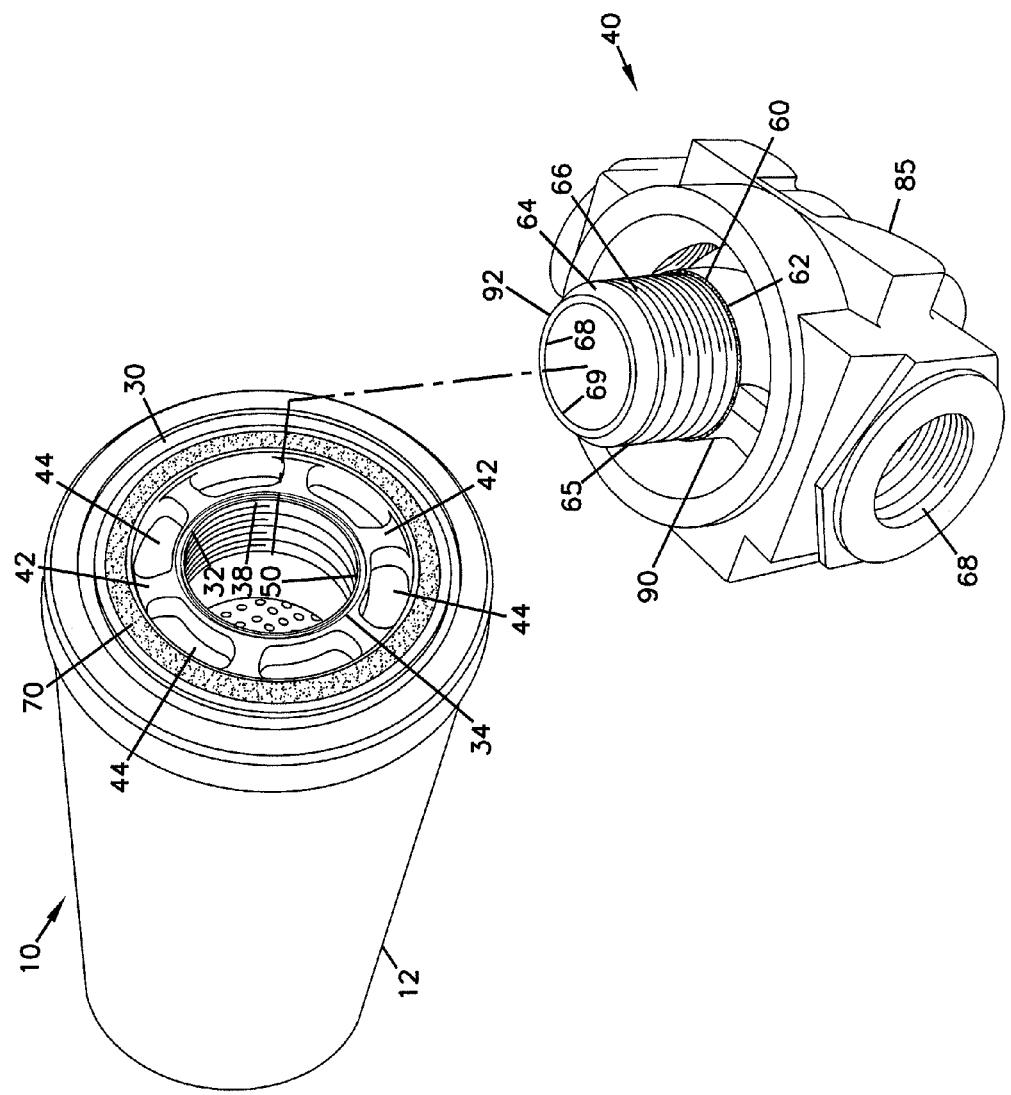
FIG. 2 is a perspective view of a spin-on filter cartridge and filter head forming a filter assembly constructed according to principles of this disclosure.
Figure 3:
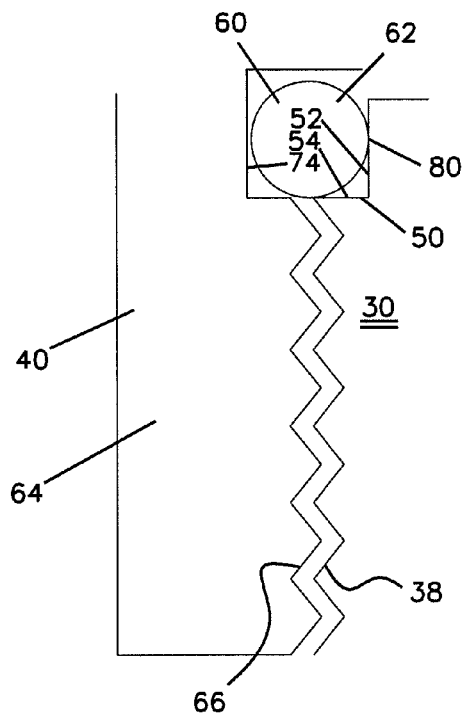
FIG. 3 is a schematic, cross-sectional view of a portion of a threaded connection between the spin-on filter cartridge of FIG. 1 and the filter head of FIG. 2, constructed according to principles of this disclosure.

While a variety of implementations of baffle plates 30 are usable without departing from design principles of this disclosure, one type of baffle plate is illustrated in FIGS. 1-3 for illustrative purposes. In the embodiment shown, the baffle plate 30 includes a central hub 34 with an interior wall 36 which defines the central flow aperture 32. Along the interior wall 36 are defined threads 38 for operably mating with threads on a filter head 40 (FIGS. 2 and 3). In the particular embodiment shown, the baffle plate 30 further includes a plurality of ribs 42 extending from the central hub 34. As can be seen in FIG. 2, the ribs 42 are spaced from each other to define regions or fluid openings 44. In preferred embodiments, the fluid openings 44 are inlet apertures forming an inlet arrangement.

The baffle plate 30 further includes a groove 50, and in the embodiment shown, a continuous groove 50. In preferred implementations, the continuous groove 50 is a circular groove 50. The groove 50 is defined by a radial surface 52 and an axial support surface 54 generally orthogonal to the radial surface 52. In some embodiments, the radial surface 52 is a sealing surface; in some embodiments, the support surface 54 functions as a sealing surface. Immediately adjacent and intersecting the support surface 54 is hub interior 36 including the threaded section 38. The groove 50 is immediately adjacent to and circumscribes the central flow aperture 32. The groove 50 operates as a seat 56 for a seal member, such as an O-ring. In the embodiment shown, the central hub 34 terminates at the central groove 50 along an axial face 51 of the baffle plate 30.

Figure 6:
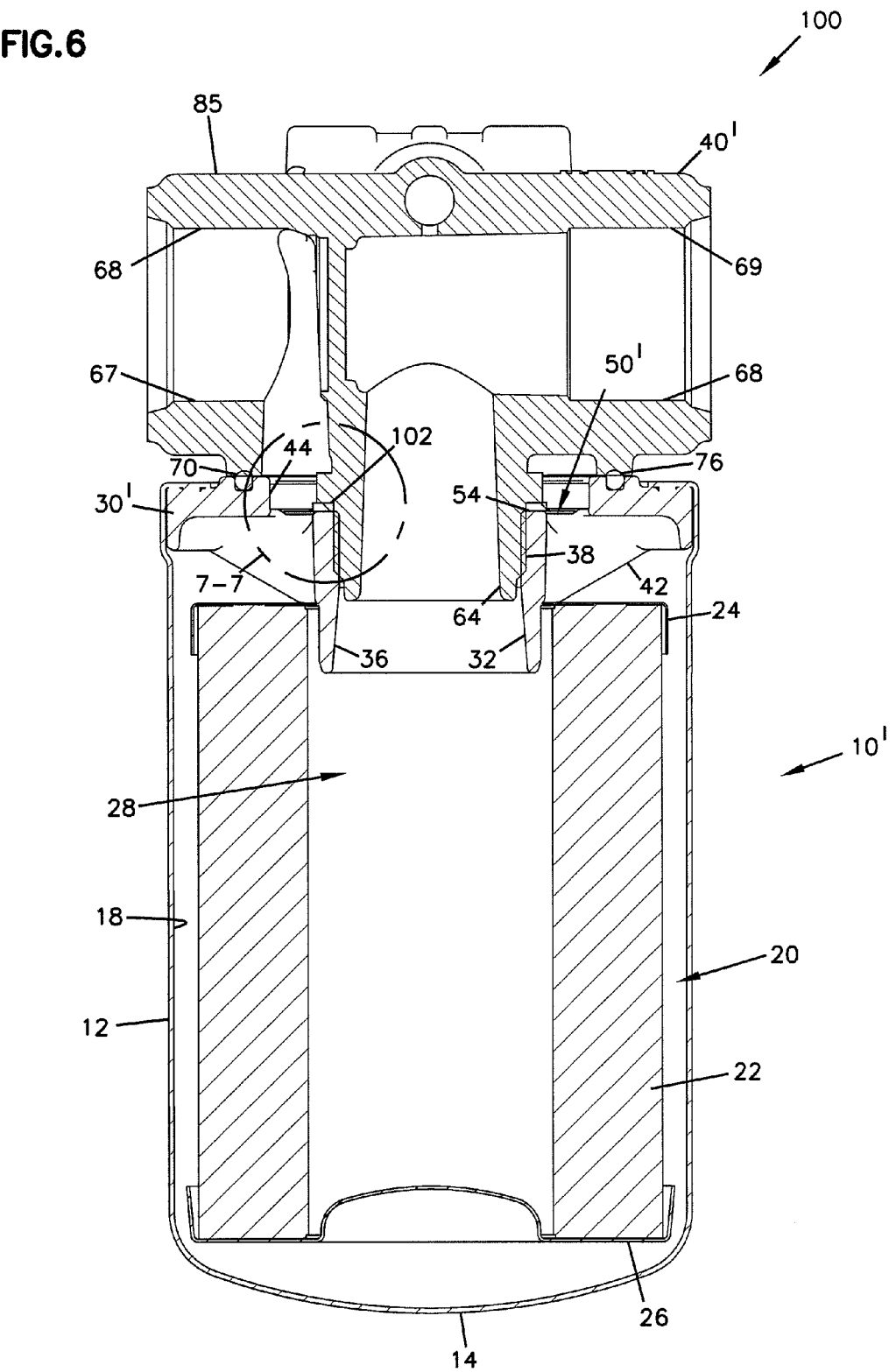
FIG. 6 is a schematic, cross-sectional view of the filter assembly of FIGS. 4 and 5, the cross-section being taken along the line 6-6 of FIG. 5.
Figure 9:
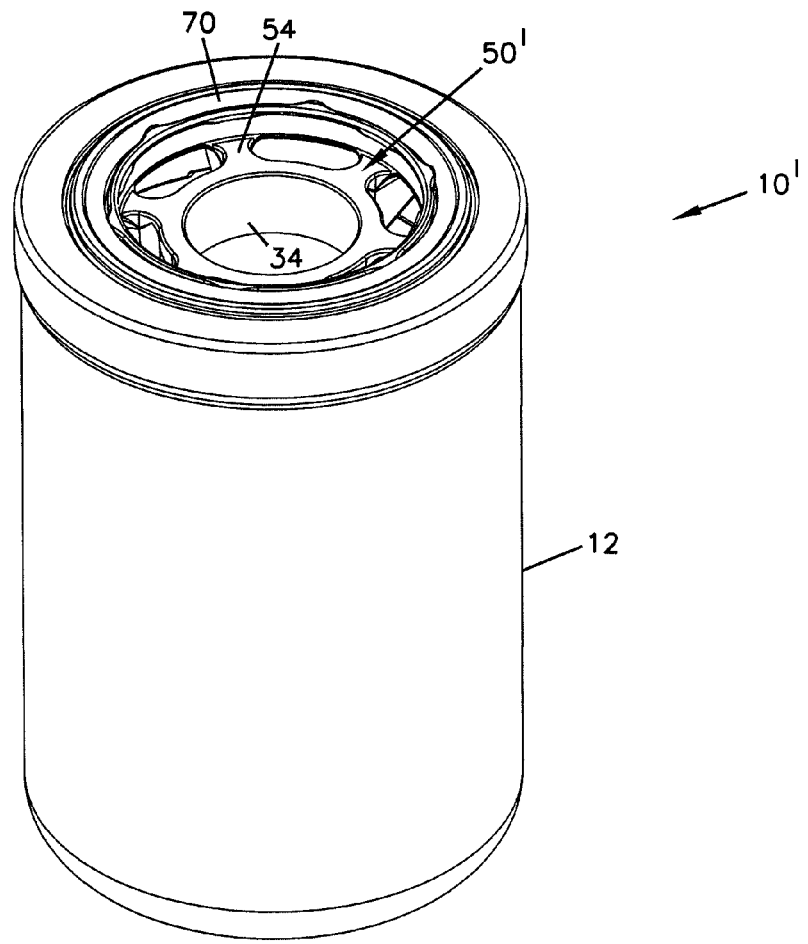
FIG. 9 is a perspective view a filter cartridge usable with the filter heads of the preceding embodiments, constructed according to principles of this disclosure.
Figure 10:
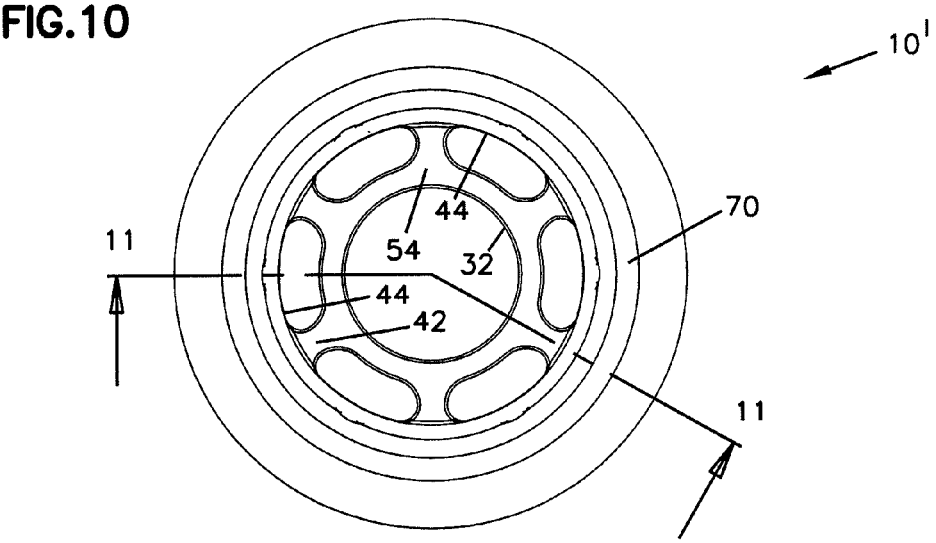
FIG. 10 is a top plan view of the filter cartridge depicted in FIG. 9.
Figure 11:
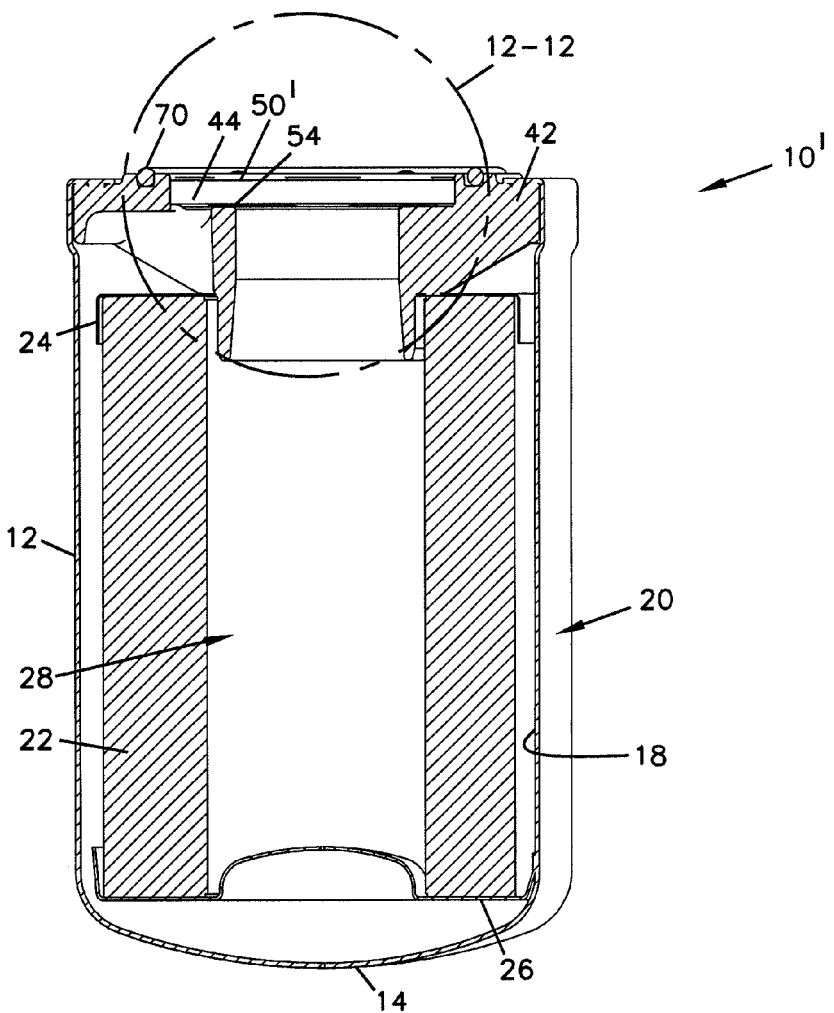
FIG. 11 is a schematic, cross-sectional view of the filter cartridge depicted in FIGS. 9 and 10, the cross-section being taken along the line 11-11 of FIG. 10.
Figure 12:
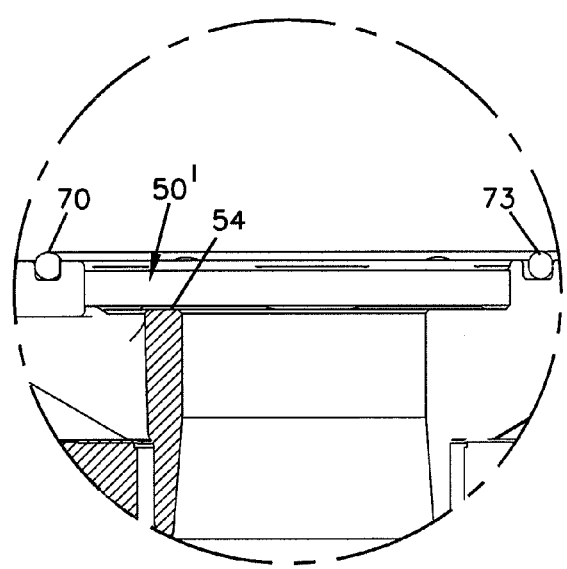
FIG. 12 is an enlarged, fragmented view of the cross-section depicted in section 12-12 of FIG. 11.

The baffle plate 30 further includes a seal arrangement 70 secured to the baffle plate 30 spaced from and circumscribing the continuous groove 50. The seal arrangement 70 is seated within a groove 72. The seal arrangement 70 can be an O-ring seal member 73. The seal member 73 forms a primary seal 76 (FIG. 6) between the filter cartridge 10 and the filter head 40, when the filter cartridge 10 is operably oriented on the filter head 40. It should be noted that FIG. 6 depicts an alternate embodiment of a filter head, depicted as 40'. This alternate embodiment is described further below; however, with respect to the primary seal 76, it does not change between the filter head 40 of the embodiment of FIGS. 1-3 and the embodiment of FIG. 6.

In reference now to FIG. 2, one embodiment of the filter head 40 is depicted. The filter head 40 can be a conventional filter head, other than the provision of a seal member 60. In the embodiment shown, the seal member 60 is an O-ring 62 operably oriented around and against a central spud 64 on the filter head 40. The central spud 64 includes a wall 65 with threads 66 that mate with the threads 38 on the central hub 34. The seal member 60 is oriented at a proximal end 90 of the spud 64, such that the threads 66 are located between the seal member 60 and a distal or free end 92 of the spud 64.

The filter head 40 generally comprises a block 85 defining fluid flow channels 68, including inlet channel 67 (FIG. 6) and outlet channel 69 (FIG. 6). The filter head 40 can also include bypass valves. Useful filter heads are described in U.S. Pat. Nos. 5,104,537; 4,883,083; and 6,024,869, each of which is incorporated by reference herein.

In operation, when the filter cartridge 10 is spun on and operably oriented on the filter head 40, the O-ring seal member 62 is received within the continuous groove 50 and forms a seal 80 (FIG. 3). In the embodiment depicted in FIG. 3, the seal 80 is a radially directed seal that is formed between and against radial surface 52 on the baffle plate 30 and a radial surface 74 on the spud 64 of the filter head 40. As can be seen in FIG. 3, other surfaces, including axial surfaces such as support surface 54 can form components to the seal 80. The seal 80 will typically be a secondary seal to help prevent migration of unfiltered fluid along a path between the threads 66 on the filter head 40 and the threads 38 on the filter cartridge 10. The seal arrangement 70 also forms primary seal 76 between and against the baffle plate 30 and the filter head 40.

Once the filter cartridge 10 is operably oriented on the filter head 40, in a forward flow system, fluid to be cleaned enters the filter head 40, 40' through, for example, one of the fluid flow channels 68 (FIG. 6). Next, the fluid flows through the inlet passages 44 in the baffle plate 30. Next, the fluid flows from the volume 18 outside of the filter element 20, through the media 22, and into the open filter interior 28. The filter media 22 helps to remove debris and particulate material from the fluid. From there, the fluid flows from the open filter interior 28 through the central flow aperture 32 and then into the filter head 40, 40'. The fluid then exits the filter head 40, 40' through one of the flow passages 68, such as outlet passage 69.

Figure 4:
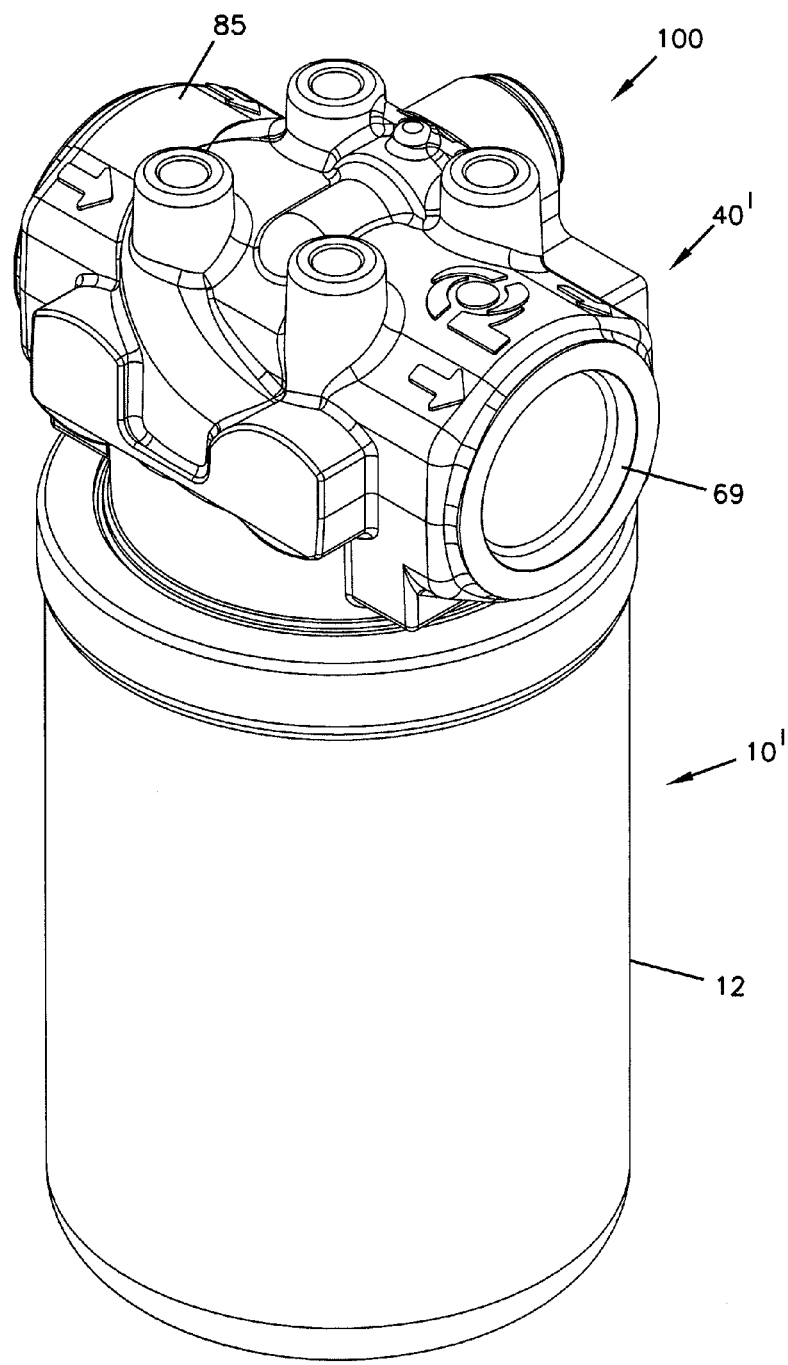
FIG. 4 is a perspective view of a filter assembly including a filter head and a filter cartridge constructed according to principles of this disclosure.
Figure 5:
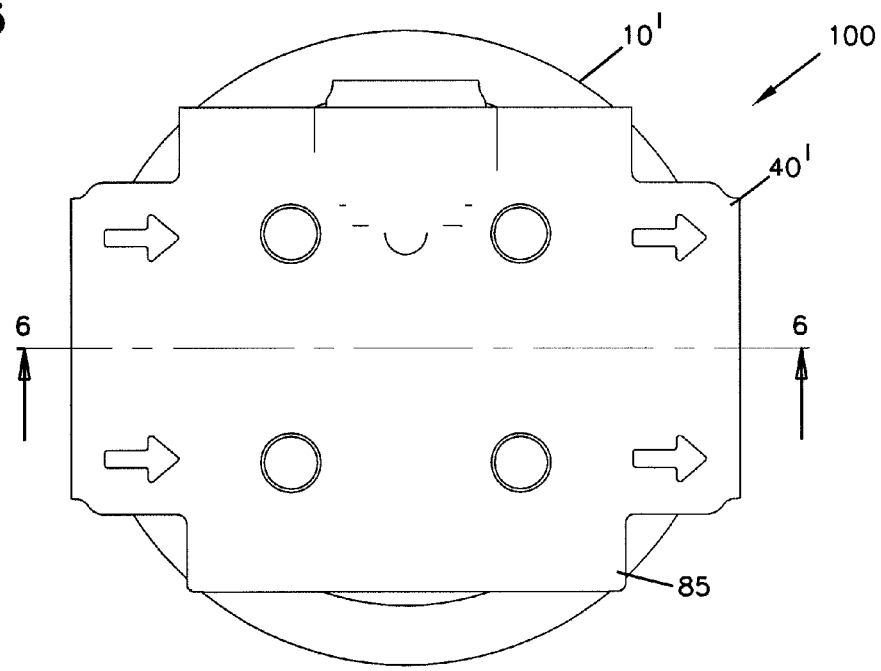
FIG. 5 is a top plan view of the filter assembly of FIG. 4.
Figure 7:
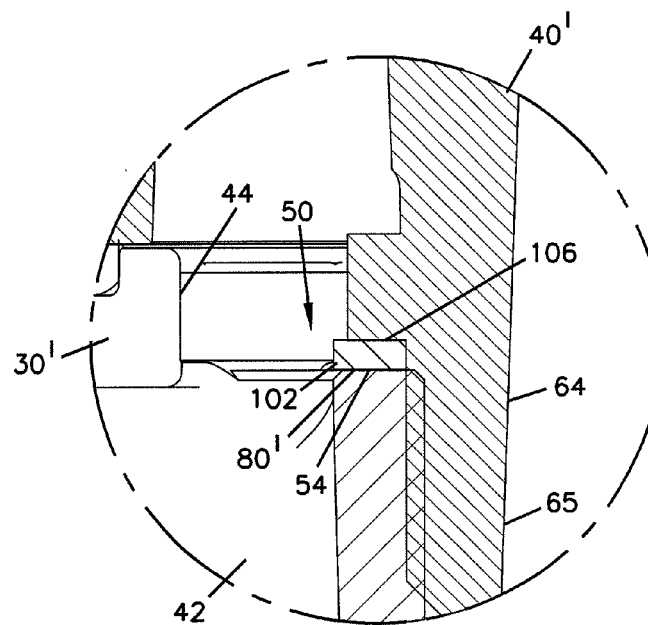
FIG. 7 is an enlarged, fragmented view of the cross-section depicted in FIG. 6 at portion 7-7.

In reference now to FIG. 4, a filter assembly is shown at reference numeral 100, the filter assembly 100 includes the filter cartridge 10' and the filter head 40, 40'. In the embodiment in FIG. 4, the filter head is depicted as filter head 40' because of a variation from the filter head 40 depicted in FIG. 2. The variation is described further below but is otherwise analogous to the filter head 40. FIG. 6 illustrates a cross-sectional view of the filter assembly 100, taken along the line 6-6 of the top view of the assembly 100 in FIG. 5. In the embodiment of FIGS. 4-7, the filter cartridge is depicted as cartridge as 10' because of a variation in the baffle plate 30. This variation is described further below.

Figure 8:
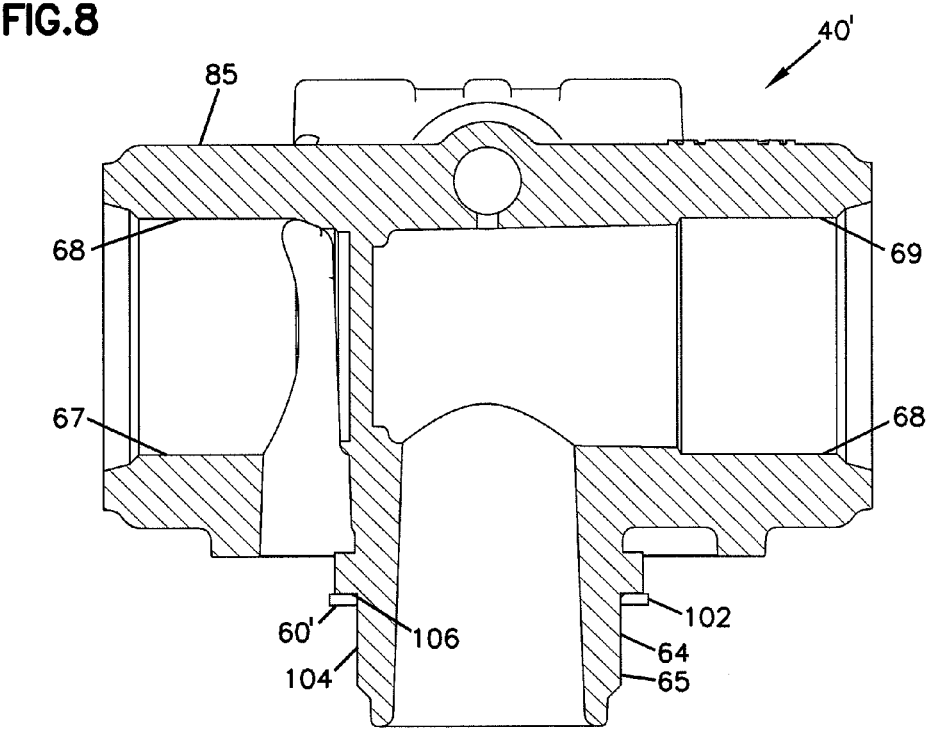
FIG. 8 is a schematic, cross-sectional view of the filter head alone depicted in the filter assembly of FIGS. 4-7.

In FIG. 8, the filter head 40' is illustrated. As with filter head 40, the filter head 40' in FIG. 8 includes a seal member 60' circumscribing the spud 64. In this embodiment, the seal member 60' is embodied as an axial seal gasket 102. The gasket 102 is oriented to be against the spud 64 along a radial wall 104 of the spud 64 and also against an axial wall 106 which is orthogonal to the radial wall 104. It should be understood that spud 64 includes threads analogous to threads 66, but the threads are not specifically depicted in the FIG. 8 embodiment.

Turning again to FIG. 6, the filter cartridge 10' includes a groove 50', which is analogous to the groove 50 of the embodiment of FIGS. 1-3. In this embodiment, the groove 50' is also immediately adjacent to the central aperture 32 of the baffle plate 30 and it is extended to the openings 44. The groove 50' defines sealing surface, which is also the support surface 54. When the filter cartridge 10' is spun onto the filter head 40', primary seal 76 is formed between seal arrangement 70 and filter head 40'. Secondary seal 80' (FIG. 7) is formed by axial compression between the gasket 102 and the sealing surface 54 of the baffle plate 30. Specifically, the gasket 102 is squeezed between axial wall 106 on the filter head 40' and the support surface 54 on the baffle plate 30 of the filter cartridge 10'. It should be understood that in other embodiments, the gasket 102 could be mounted on the filter cartridge 10', with the corresponding groove being formed on the filter head 40' at the intersection between axial wall 106 and radial wall 104.

FIGS. 9-12 depict the filter cartridge 10', which is usable with the filter head 10, 10'. The threads 38 depicted in FIG. 1 are omitted in FIGS. 9-12 for purposes of clarity. In FIGS. 9-12, the groove 50' can be seen, particularly in FIG. 12. It should be understood that if the filter cartridge 10' having groove 50' is used with the filter head 40 of FIGS. 2 and 3, the secondary seal will not form, because there will not be a continuous radial sealing surface on the baffle plate 30 to form the secondary seal 80. However, the filter cartridge 10' is usable with the filter head 40, and the primary seal 76 will still be in place. If the filter cartridge 10' is used with the filter head 40', then the secondary seal 80' (FIG. 7) is formed between support surface or sealing surface 54 and filter head 40'.

What is claimed is:

1. A spin-on filter cartridge comprising:
   (a) a housing having a closed end, an open end, and an interior volume;
   (b) a filter element operably oriented in the housing interior volume;

(c) a baffle plate operably oriented over the housing open end; the baffle plate defining a central flow aperture; the baffle plate having an outer surface and an opposite inner surface, the inner surface facing the housing interior volume;
  (i) the baffle plate defining a continuous groove in the outer surface immediately adjacent to and forming part of the central flow aperture;
  (ii) the continuous groove defining a radial sealing surface and a support surface; the support surface being orthogonal to the radial surface; the continuous groove being seal member free and constructed to receive a seal member from an operably placed filter head;
  (iii) the baffle plate defining an inlet arrangement and an outlet arrangement;
    (1) the outlet arrangement comprising the central flow aperture; and
    (2) the inlet arrangement comprising a plurality of fluid apertures circumscribing the central flow aperture;
  (iv) the baffle plate including a central hub defining the central flow aperture; the central hub having an inner, threaded wall;
  (v) the baffle plate including a plurality of ribs extending from the central hub; the inlet arrangement being defined by a region between adjacent ribs; and
(d) a seal arrangement secured to the baffle plate spaced from and circumscribing the continuous groove;
  (i) the seal arrangement being seated within a seal arrangement groove in the outer surface of the baffle plate;
  (ii) the support surface of the continuous groove being located axially closer to the closed end of the housing than the seal arrangement groove is located axially relative to the closed end of the housing; and
  (iii) the support surface of the continuous groove being located between an end of the threaded wall and the seal arrangement groove.

2. A filter assembly comprising:
(a) a spin-on filter cartridge including:
  (i) a housing having a closed end, an open end, and an interior volume;
  (ii) a filter element operably oriented in the housing interior volume; and
  (iii) a baffle plate operably oriented over the housing open end; the baffle plate defining a central flow aperture; the baffle plate having an outer surface and an opposite inner surface, the inner surface facing the housing interior volume; the baffle plate having a central hub defining the central flow aperture; the central hub having an inner, threaded wall with an end;
    (A) the baffle plate defining a continuous groove in the outer surface defined by both a radial seal surface and an axial surface, the groove being immediately adjacent to and forming part of the central flow aperture; the continuous groove being seal member free and constructed to receive a seal member from an operably placed filter head; and
  (iv) a seal arrangement secured to the baffle plate spaced from and circumscribing the continuous groove;
    (A) the seal arrangement being seated within a seal arrangement groove in the in the outer surface of the baffle plate; and
    (B) the axial surface of the continuous groove being located axially closer to the closed end of the housing than the seal arrangement groove is located axially relative to the closed end of the housing;
    (C) the axial surface of the continuous groove being located between the end of the threaded wall and the seal arrangement groove; and
(b) a filter head; the spin-on filter cartridge being removably mountable on the filter head; the filter head including:
  (i) a central spud defining outer threads that mate with the threaded wall of the central hub;
  (ii) a seal member operably oriented around the central spud;
(c) wherein, when the spin-on filter cartridge is operably oriented on the filter head, the seal member is received within the continuous groove forming a secondary seal between the cartridge and the filter head, and the seal arrangement forms a primary seal between and against the baffle plate and the filter head.

3. A filter assembly according to claim 2 wherein:
(a) the seal member comprises an O-ring seal member.

4. A filter assembly according to claim 3 wherein:
(a) the secondary seal comprises a radially directed seal between and against the filter head and the radial surface on the continuous groove.

5. A filter assembly according to claim 2 wherein:
(a) the baffle plate defines an inlet arrangement and an outlet arrangement;
  (i) the outlet arrangement comprising the central flow aperture; and
  (ii) the inlet arrangement comprising a plurality of fluid apertures circumscribing the central flow aperture.

6. A filter assembly according to claim 5 wherein:
(a) the baffle plate includes a central hub defining the central flow aperture; the central hub having an inner, threaded wall mateable with the threads on the central spud of the filter head; and
(b) the baffle plate includes a plurality of ribs extending from the central hub; the inlet arrangement being defined by a region between adjacent ribs.

7. A filter assembly according to claim 6 wherein:
(a) the central hub terminates at the central groove.

8. A method of assembling a filter assembly comprising:
(a) providing a filter cartridge including:
  (i) a housing having a closed end, an open end, and an interior volume;
  (ii) a filter element operably oriented in the housing interior volume; and
  (iii) a baffle plate operably oriented over the housing open end; the baffle plate defining a central flow aperture; the baffle plate having an outer surface and an opposite inner surface, the inner surface facing the housing interior volume; the baffle plate having a central hub defining the central flow aperture; the central hub having an inner, threaded wall with an end;
    (A) the baffle plate defining a continuous groove in the outer surface defined by both a radial seal surface and an axial surface adjacent to and forming part of the central flow aperture; the continuous groove being seal member free and constructed to receive a seal member from an operably placed filter head; and
  (iv) a seal arrangement secured to the baffle plate spaced from and circumscribing the continuous groove;
    (A) the seal arrangement being seated within a seal arrangement groove in the outer surface of the baffle plate; and (B) the axial surface of the continuous groove being located axially closer to the closed end of the housing than the seal arrangement groove is located axially relative to the closed end of the housing; the axial surface of the continuous groove being located between the end of the threaded wall and the seal arrangement groove; and (b) spinning the filter cartridge onto a filter head to form a primary seal with the seal arrangement between the baffle plate on the filter cartridge and the filter head, and until a seal member fixed to the filter head is received within the continuous groove in the baffle plate.

9. A method according to claim 8 wherein:

(a) the step of spinning includes using the seal member fixed to the filter head to form a secondary seal between a surface defining the continuous groove in the baffle plate and the filter head.

* * * * *